Sept 17, 1957    A. G. THOMAS    2,806,987
MAGNETIC MOTOR
Filed Aug. 30, 1954    6 Sheets-Sheet 1

Albert G. Thomas  INVENTOR

Sept 17, 1957     A. G. THOMAS     2,806,987
MAGNETIC MOTOR Filed Aug. 30, 1954     6 Sheets-Sheet 2

Albert G. Thomas INVENTOR

Sept 17, 1957  A. G. THOMAS  2,806,987
MAGNETIC MOTOR

Filed Aug. 30, 1954  6 Sheets-Sheet 3

Albert G. Thomas  INVENTOR

Sept 17, 1957     A. G. THOMAS     2,806,987
MAGNETIC MOTOR Filed Aug. 30, 1954     6 Sheets-Sheet 5

INVENTOR
Albert G. Thomas

Fig. 13

United States Patent Office 2,806,987
Patented Sept. 17, 1957

2,806,987

MAGNETIC MOTOR

Albert G. Thomas, Chattanooga, Tenn.

Application August 30, 1954, Serial No. 452,949

17 Claims. (Cl. 318—254)

This invention relates, in general, to electromagnetic devices and particularly to step motors or the like. This application is a continuation-in-part of my co-pending applications Serial No. 295,694, filed June 20, 1952, now Patent 2,774,922, December 18, 1956; Serial No. 373,187, filed August 10, 1953, and Serial No. 406,740, filed January 28, 1954.

In building and operating step motors designed with features described in the above applications, I have found that it is desirable to reduce rotor inertia and to provide increased magnetic pull or electrodynamic reaction in case a wound rotor is used. There are numerous applications which do not require extremely rapid response, but in other cases it is important for the rotor to be accelerated quite rapidly.

Further, it is often desirable to provide substantial power or torque in step motors of moderate size. In motors which I have described there have been, usually, three rotor units which were energized in sequence to cause step rotation. This resulted in two rotor units being ineffective at all times except to add inertia to the rotor system. It is therefore a primary object of the present invention to provide a step motor which has only one rotor unit.

An additional object is to provide a low-inertia rotor which may be magnetized by a plurality of phased field windings.

Another object is to provide a step motor having two phases instead of three phases as previously described.

A further object is to provide a step motor with a plurality of field and rotor units, all of the rotor units being simultaneously magnetized to provide torque.

Another object is to provide a step motor having special rotor construction to reduce interference of various fields.

Other objects will be evident in the following description when taken in connection with the accompanying drawings, in which.

Figure 1:
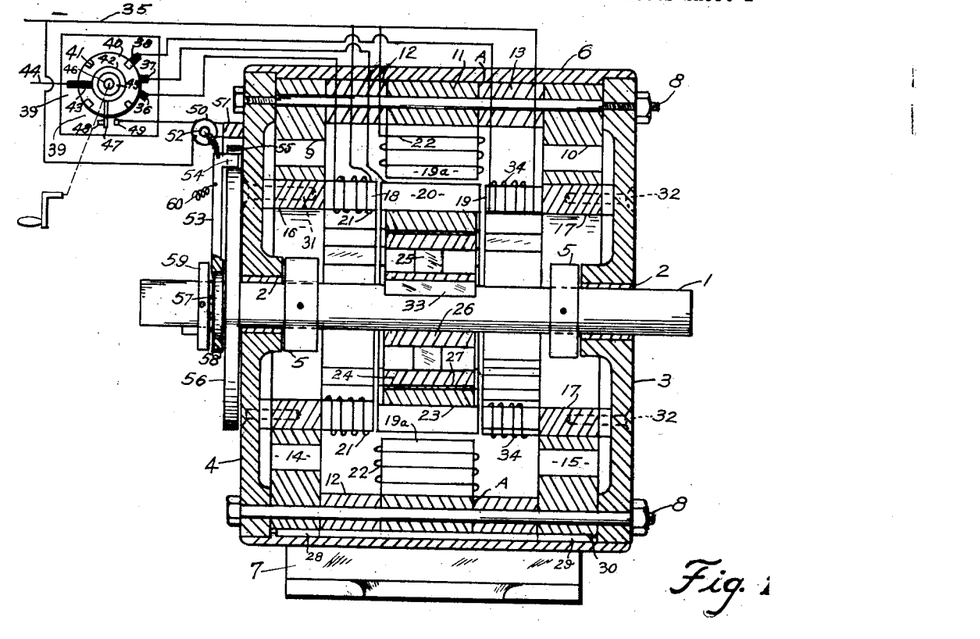
Fig. 1 is a part sectional front elevation of a three phase step motor having one rotor.

In Fig. 1 shaft 1 is rotatable in bearings 2 in end bells or face plates 3 and 4 of the motor. The shaft may hvae shoulders, or collars 5 may be fastened to the shaft to reduce side play or axial movement to a minimum. Bearings 2 may be ball or roller bearings and should, preferably, be of semi-thrust type. The motor has outer casing 6 which may be provided with suitable ventilating openings, and attached base 7. Rods 8 are passed through holes in end stator rings 9 and 10 and central stator 11, and through spacers 12 and 13 separating the stator units. Stator rings 9 and 10 may have holes 14 and 15 for reducing weight. These rings may be made of aluminum, brass, or other non-magnetic material if it is desired to provide maximum magnetic field separation between the three stator phases. These rings may also be made of non-conducting material like Bakelite or ceramics, in order to reduce hysteresis and eddy current losses. The rings surround annular stator rings 16 and 17 having respective inwardly projecting teeth or poles 18 and 19 equally spaced around the face of the rings as illustrated by ring 16 and teeth 18 shown in Fig. 3. Each stator unit has the same number of teeth as there are rotor teeth 20. The peripheral tooth widths $a$ are preferably equal to the intervening peripheral spaces $b$. Similarly, the inner peripheral tooth widths $c$ are preferably equal to the peripheral spaces $d$, there being preferably an even number of poles. The radial length of the poles or teeth is chosen with respect to the axial length, and other characteristics of rotor teeth 20 so that the torque provided by central stator teeth $19_a$ will be approximately equal to the torque provided by either of the end stator teeth 18 or 19. Every other stator tooth 18 is shown as being surrounded with a magnetizing winding 21, in which case the polarity of each wound tooth will be the same. If each tooth is wound, the teeth will be of alternate opposite polarity. The side stator unit 17–19 is made like the unit 16.18, but is phased differently with respect to rotor teeth 20.

Stator teeth or poles 19 are equal in number to the number of rotor teeth 20 and are equally spaced around the rotor periphery, allowing for the air gap, and equal in circumferential width to the circumferential spacing between the teeth. Field windings 22 are wound around every other stator tooth, the polarity of each wound tooth being the same. Each tooth could be wound, however, in which case the polarity would alternate.

Rotor teeth 20 are integral with ring 23, all rotor and stator teeth and magnetized elements being of silicon steel or other metal of good magnetic permeability. Rotor teeth 20 extend radially outward from ring 23 and preferably are wider in axial direction than associated stator teeth $19_a$ as shown. There is a small air gap of several thousandths of an inch or more between teeth $19_a$ and teeth 20 which are arranged circularly around the axis of shaft 1. Ring 23 is pressed on rotor ring 24 or otherwise fastened thereto, which ring is integral with spokes 25 extending from rotor hub 26. Ring 24, spokes 25, and hub 26 may be cast in aluminum or magnesium alloy, if desired, in order to provide a rotor of low inertia. Furthermore, ring 23 may be insulated from ring 24 by a thin coat 27 of shellac, plastic, or other insulating material, or insulation 27 may comprise a sleeve of Bakelite or the like. The rings may be fastened together by means of Bakelite or other insulating screws. It is desirable that the coefficients of expansion of rings 23 and 24 be not too dis-similar. Ring 23 may be separated into quadrants or into more sections and may be screwed to ring 24, in order to reduce the effect of eddy currents.

The rotor teeth 20 are spaced from stator teeth 18 and 19 sufficiently to prevent the magnetic pull from causing the rotor to be locked againts the stator units at either side of the rotor.

Rings 9 and 10 will be prevented from rotating by rods 8, but more accurate circular alignment may be achieved by having keys 28 and 29, extending from the rings, to fit in groove or slot 30 extending across the inner circular surface of frame 6. Similar keys may be used to tie the spacers in place. End bell 4 may be circularly tied to ring 16 by screws or dowels 31 and end bell 3 may be similarly tied to ring 17 by screws or dowels 32. Dowels may be placed between the rings and spacers or between rings and frame at any desired interfaces to prevent relative movement.

Rotor hub 26 may be fastened to shaft 1 by means of key 33 working in slots in the hub and shaft, or set screws may be used.

Figure 6:
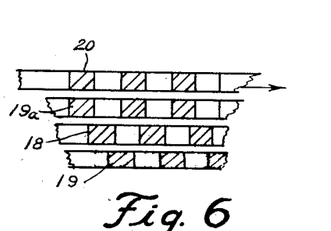
Fig. 6 is a phasing diagram, showing the relationship of a three-rotor motor with respect to associated stator units.

A positional phasing of the three stator sections or phases, with respect to the rotor poles or teeth, is shown schematically in Fig. 6. The rotor poles 20 are in register or alignment with stator poles 19a. For rotor rotation in the relative direction of the arrow, the stator poles or teeth 18 will then overlap the rotor teeth by ⅓ tooth width. The stator teeth 19 overlap the stator teeth 18 by ⅓ tooth width as shown. Therefore, if stator windings 21 are supplied current to magnetize poles 18, rotor teeth 20 will be magnetically snapped into alignment with poles 18 and the right edges of rotor poles 20 will overlap field or stator poles 19 by ⅓ tooth width. Then if poles 19 are magnetized by current passed through windings 34, rotor poles 20 will be magnetically snapped into alignment with poles 19. Then stator poles 19a are magnetized again by current passing through windings 22 and so the stator poles are magnetized sequentially, causing step rotation of the rotor 20-23. Alternate poles may be wound, or every pole may be wound as already described. The pole windings of any stator unit or phase may be connected in series, parallel, or series-parallel as desired.

One terminal of each of the three stator windings is connected to negative line 35 of a generator or other direct current supply system. The remaining terminal of windings 21 is connected to brush 36; the remaining terminal of windings 22 is connected to brush 37, and the remaining terminal of windings 34 is connected to brush 38. These brushes are spring-pressed against the periphery of commutator 39 comprising insulating disc 40 having metal contacts or commutator bars 41 imbedded therein. These bars are electrically connected together and to slip ring 42 against which brush 43 is pressed. Brush 43 is connected to positive line 44 of the direct current supply. Bars 41 are equally spaced and may be separated so that any field unit will be de-energized as another is energized or de-energization may occur before another is energized.

Figure 2:
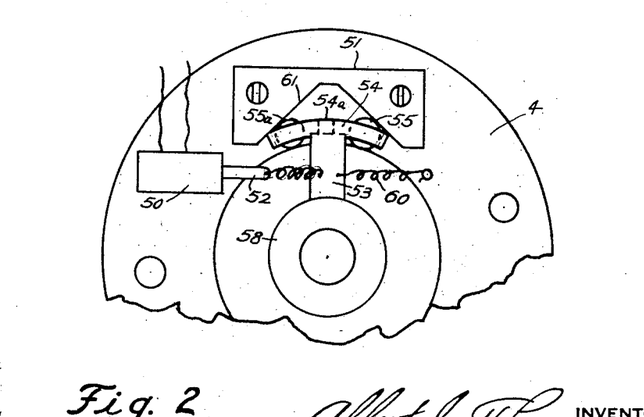
Fig. 2 is a fragmentary left end view of the motor of Fig. 1, showing an alternative brake construction.

Shaft 46 is rotatable in a suitable bearing in plate 47 and may be turned manually or otherwise. Friction ring 45 surrounds shaft 46 and has attached contact arm 47 which is limited in movement by stop 48 in one direction and by contact 49 in opposite direction. A suitable spring attached to the ring may provide friction by rubbing against shaft 46. Contact 49 is electrically connected with one terminal of solenoid 50 which is fastened to inverted V cam 51 which is screwed to end bell 4, although the solenoid may be attached to plate 4 as indicated in Fig. 2. The other terminal of solenoid 50 is electrically connected with negative line 35. Plunger 52 of the solenoid is connected to arm 53 by means of a link or stiff spring. This arm carries a yoke 54 which cages hardened roller 55 which rolls or hardened disc 56 having hub 57 which is keyed or otherwise fastened to shaft 1. Arm 53 is integral with hub 58 which surrounds hub 57, allowing the latter to rotate freely. Collar 59 is fastened to shaft 1 and serves to retain arm 53 in position. Tension spring 60, attached to arm 53 and to plate 4 or another fixed part of the motor, normally pulls the arm and roller over so that the roller wedges between disc 56 and one inclined surface of hardened cam 51. This allows counter-clockwise rotation of disc 56 and rotor 20–23, as viewed from the left, but clockwise rotation of the disc and rotor is prevented by the pinching or wedging action of the roller between the disc and cam. If solenoid 50 is energized, plunger 52 will be pulled into the solenoid, carrying roller 55a over against the opposite surface 61 of cam 51 (Fig. 2) which allows clockwise rotation of disc 56 and the rotor, but not counter-clockwise rotation.

If it is desired to use this brake system with small angular shift of arm 53, a double roller construction can be used as shown in Fig. 2. In this case two rollers, 55 and 55a are caged by frame 54 carried by arm 53, with a partition 54a between the rollers which are free to move in generally radial direction relative to shaft 1. The spring 60 causes the cage 54 to pinch roller 55 between disc 56 and cam surface 62 and plunger 52, when pulled into the solenoid, causes roller 55a to be pinched between disc 56 and cam surface 61. Due to this double construction the effective locking action of the rollers can be reversed in direction by a small angular movement of arm 53.

In operation, shaft 46 is turned, carrying contacts or bars 41 past brushes 36, 37, and 38 in that order, for counter-clockwise rotation of shaft 46. This results in arm 47 being rotated by friction until it strikes contact 49 thereby connecting positive line 44 with the open terminal of solenoid 50, since brush 43 is electrically connected with arm 47. Solenoid 50 is therefore energized and roller 55a is pulled over against cam surface 61 (Fig. 2), allowing clockwise rotation of disc 56 and the rotor, but not reverse rotation thereof. This locking action effectively prevents any appreciable backswing of the rotor which would otherwise occur and so, erratic oscillations or hunting are effectively eliminated. It is assumed that the phasing of the stator sections or units is such that clockwise rotation of the rotor will occur when the stator windings 21, 22 and 34 are energized in that order. The phasing need not necessarily be that indicated in Fig. 6, but can be arranged in various orders as long as the necessary conditions for causing rotation are met. The arm 47 may have a snap-over spring or detents can be used to prevent chatter.

If shaft 46 is rotated in clockwise direction, current from brush 43 will be distributed to brushes 38, 37, and 36 in that order and stator windings 34, 22, and 21 will be supplied current in that sequence, resulting in counter-clockwise rotation of disc 56 and shaft 1 as seen in Fig. 2. In this case arm 47 is carried against stop 48 and the solenoid is de-energized so that spring 60 pulls frame 54 and roller 55 engages cam surface 62, and so allows counter-clockwise rotation of shaft 1 and the attached rotor, but not rotation in the opposite direction. As before, oscillations and backswing of the rotor are largely eliminated by this brake.

A marked advantage of this motor construction is that there is only one rotor so that rotor inertia is kept to a minimum, resulting in faster acceleration, and greater controlled speed of the rotor and attached shaft. Construction of the rotor and stator units should be sufficiently rigid to prevent the magnetic pull of the stator poles 18 or 19 from attracting the rotor poles into mechanical contact with the stator poles.

Figure 3:
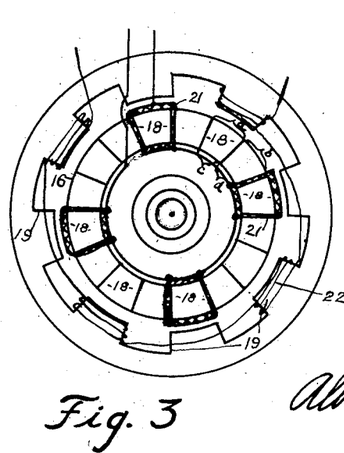
Fig. 3 is a face elevation showing construction of the side stator units of the motor of Fig. 1.
Figure 5:
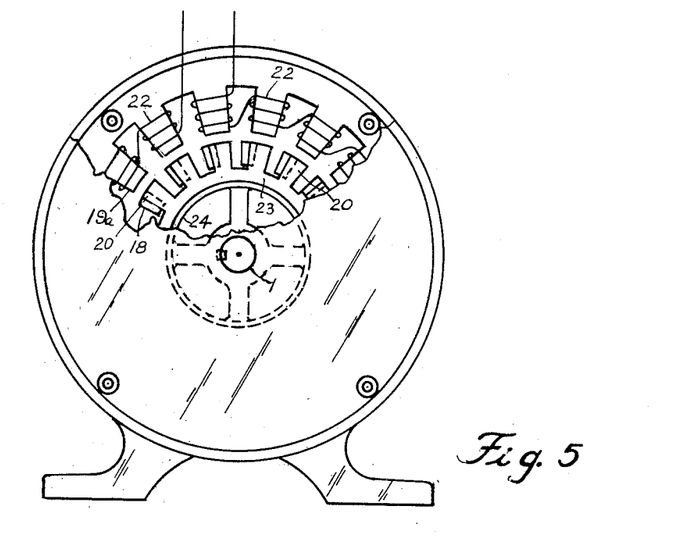
Fig. 5 is a right end elevation of the motor of Fig. 1, the right end bell being broken away in part.
Figure 9:
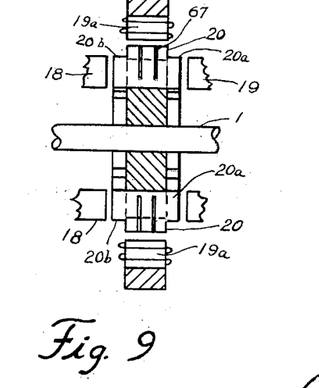
Fig. 9 is a fragmentary part sectional front elevation showing a special rotor designed to reduce magnetic leakage to stator units.

Fig. 5 shows a view similar to that of Fig. 3 and indicates the positional phasing of rotor teeth 20 with respect to stator teeth 19a and stator teeth 18, if the latter are to be energized immediately after teeth 19a are energized. Teeth 20 are shown in alignment with teeth 19a and teeth 20 overlap stator teeth 18 by ⅓ tooth width. Therefore, if stator teeth 18 are next magnetized, teeth 20 will be snapped into alignment with them, rotating teeth 20 and attached shaft 1 one step counter-clockwise. In actual practice, due to momentum of the rotor, the teeth will overlap by more than ⅓ tooth width, reverse movement or backswing being prevented by the locking brake as described. Deep circular saw cuts 67 may be made around the periphery to separate the fields and reduce losses. The rotor teeth 20 are made to project beyond the stator teeth 19a in axial direction in order to remove teeth 19a, in effect, from the magnetic circuit including teeth 18 and teeth 20 or teeth 19 and teeth 20. This separation may be further enhanced by the construction shown in Fig. 9. The rotor teeth 20 have integral side or face teeth 20a and 20b at shorter radius than the outer radius of teeth 20. This removes the magnetic field between teeth 20a and stator teeth 19 from close proximity to stator teeth 19a, thereby reducing the possible interference of these stator teeth with the magnetic pull due to the side stator teeth 19. The same condiion applies relative to stator teeth 18, rotor teeth 20b and stator teeth 19a.

Figure 10:
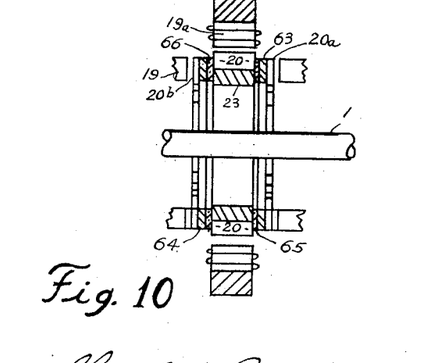
Fig. 10 is a part sectional front elevation of a modification of the rotor as shown in Fig. 9.

The construction shown in Fig. 10 further separates the effects of the central and side stator fields. In this modification the rotor teeth 20a and 20b are integral with silicon steel or other magnetizable rings 63 and 64 which are screwed or otherwise fastened to rotor rim or ring 23 on opposite faces as indicated. Non-magnetic ring 65 is placed between rings 23 and 63 and may be of plastic, ceramics or other non-conductive material in order to reduce eddy current. Non-magnetic, and preferably non-conductive ring 66 is similarly placed between rings 64 and 23. Rings 63 and 64 are coaxial with shaft 1 and may be split in order to reduce eddy currents.

Figure 11:
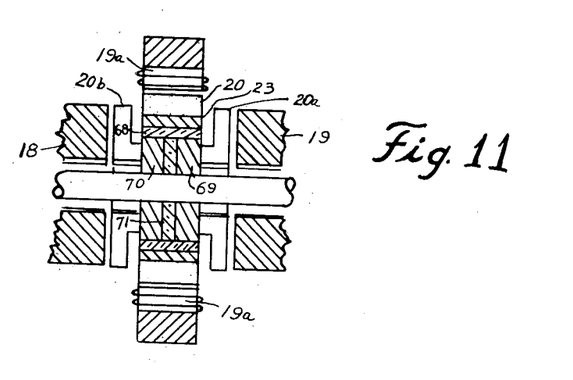
Fig. 11 is another part sectional modification of the rotor shown in Fig. 9, showing associated stator poles in fragmentary manner.

Another modification of the rotor is shown in Fig. 11. The rotor ring 23, having integral teeth 20, is fastened around Bakelite, ceramic or other insulating sleeve 68, which surrounds silicon steel or other magnetizable rotor discs 69 and 70 which are preferably integral with respective side rotor teeth 20a and 20b, shaped as indicated. Discs 69 and 70 are separated by plastic or other insulating annular washer or ring 71. The rotor assembly may be cemented or fastened together with insulated bolts or screws. It will be observed that the wing-like side rotor teeth 20a and 20b are completely separated, magnetically, from central rotor teeth 20. The teeth 20a and 20b may be extended outward as shown in order to give advantages of a greater radius, comparable to the effective radius of teeth 20. Rings 69 and 70 may be insulated from shaft 1 if desired.

In the various drawings like parts will usually be given like numerals.

Figure 4:
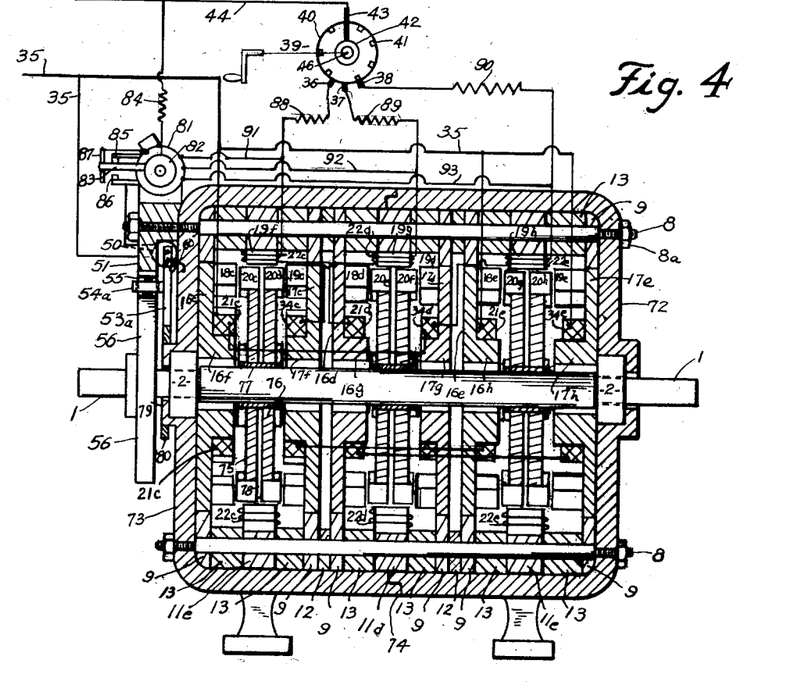
Fig. 4 is a part sectional front elevation of a three phase step motor having three rotors each of which is effective in providing torque during energization of each field winding.

In Fig. 4, cup-like casing members 72 and 73 are clamped together at the inter-face 74 by shoulder bolts 8 and nuts 8a. Stator rings 11c, 11d, and 11e, having stator teeth 19f, 19g, and 19h similar to stator teeth 20 previously described, are made of silicon steel or the like and are separated by suitable non-magnetic or non-conductive spacers 9, 12, and 13 made of aluminum, Bakelite, ceramic material, or other suitable material, in order to provide magnetic separation of the various phases or components, and to reduce eddy current losses.

The circularly spaced face stator teeth 18c are intergral with silicon steel or other magnetizable disc 16c having hub 16f bored to provide space between the hub and shaft 1 which is provided with shoulders adjacent semi-thrust ball or roller bearings 2 supported in recesses cut in casing members 72 and 73. Stator teeth 18c, 18d and 18e are of similar construction and spacing as teeth 18 described in connection with Fig. 1. Stator teeth 18d and 18e are integral with magnetizable discs 16d and 16e supported by annular spacers 9, as well as disc 16c. The discs 16d and 16e have respective hubs 16g and 16h. Similarly, opposite stator teeth 19c, 19d, and 19e are integral with respective magnetizable discs 17c, 17d and 17e having respective hubs 17f, 17g, and 17h spaced from shaft 1. Discs 17c, 17d and 17e are supported by the associated annular spacer rings 9. The stator discs may be fastened to spacers or rods or otherwise to prevent rotation.

The hubs of stator discs 16c, 16d, and 16e are surrounded by respective toroidal windings 21c, 21d, and 21e, and the hubs of stator discs 17c, 17d, and 17e are surrounded by respective toroidal windings 34c, 34d, and 34e. The relative width and spacing of the various side or face stator teeth are similar to the relative width and spacing of teeth 18 and 19 of Fig. 1. The phasing need not be the same however.

The peripheral or central stator teeth 19f, 19g, and 19h of stator units 11c, 11d, 11e are of similar width and spacing as that of previously described stator teeth 19a and alternate teeth are surrounded by windings 22c, 22d, and 22e, for magnetizing the central stator units sequentially.

Rotor teeth 20c are integral with magnetizable disc 75 which is fastened to brass or other non-magnetic sleeve 77 which is keyed or otherwise fastened to shaft 1. Rotor teeth 20d are integral with magnetizable disc 76 also fastened to sleeve 77 and the two discs are separated by air space or insulation 78 which separates the magnetic fields of teeth 20c and 20d and also tends to reduce eddy currents. The central stator teeth 19f, when magnetized, induce opposite poles in rotor teeth 20c and 20d. The gap separating the poles can at times actually increase the magnetic attraction due to magnetic field concentration at the edges.

Rotor units associated with stator teeth 19g and 19h and having respective rotor teeth 20e—20f and 20g—20h, are constructed in similar manner to that just described. The rotor teeth are uniformly spaced around the rotor periphery and are preferably of the same peripheral width as the peripheral space between them, and are equal in number to the number of associated stator teeth, counting a pair of spaced rotor teeth as one.

Hub or boss 79 projecting from plate 73 serves as a pivot or bearing for ring 80 which is integral with arm 53a carrying cage 54a which guides and moves roller 55. This roller can be shifted by arm 53a to wedge between hardened disc 56 and either inclined hardened surface of inverted V cam 51 attached to plate 73 by a rod 8 and suitable bolts.

Solenoid 50 is fastened to plate 73 and its armature is connected with arm 53a which is urged in one direction by spring 60 attached to the arm and to plate 73. When the solenoid is energized, rotation of disc 56 and shaft 1 in one direction only is allowed and when the solenoid is de-energized rotation in opposite direction only is allowed, as described in connection with Fig. 1.

Small selsyn motor 81 is fastened to cam 51 or to plate 73 and has collar 82 fastened to its shaft. Contact arm 83 is attached to collar 82, which is electrically connected with positive line 44 by means of flexible conductor 84. Arm 83 is limited in movement in one direction by stop 85 and in opposite direction by contact 86 attached to the motor and insulated therefrom. Contact 86 is electrically connected with one terminal of solenoid 50, the other terminal of which is connected to negative line 35. The primary A. C. winding of the selsyn motor is preferably short-circuited to provide greater torque. Triangular cam 87 may be used to make arm 83 snap to open or closed circuit position.

Resistors 88, 89, and 90 are connected between respective brushes 36, 37, and 38 and the respective ends of windings 22c, 22d, and 22e. The secondary or three phase connections of motor 81 are connected to points intermediate the resistors and connected windings by means of conductors 91, 92, and 93. The resistors may have values approximately equal to the impedance of the motor windings but this is not necessary in order to provide motor 81 with operating potentials. The remaining terminal of windings 22c is connected to a terminal of coil 21d which is connected in series with coil 34e which is connected back to negative line 35. Windings 22d are connected in series with coils 34c and 21e which is finally connected to line 35. Similarly, windings 22e are connected in series with coils 34d and 21c and line 35.

Brushes 36, 37, and 38 are in contact with commutator or distributor 39 which has shaft 46, slip ring 42, and brush 43 in contact therewith. This brush is connected to positive line 44. Commutator bars 41 are imbedded in insulating plastic disc 40 and are connected with slip ring 42 so that current will be distributed to brushes 36, 37, and 38 in sequence if shaft 46 is rotated.

The positional phasing of stator teeth 18d relative to rotor teeth 20e and of stator teeth 19e relative to rotor teeth 20h is such that these stator and rotor teeth are in register or alignment when rotor teeth 20c—20d are in alignment with stator teeth 19f. Therefore, rotor teeth 20c—20d, 20e, and 20h are magnetized together to exert a concerted torque when current is distributed to brush 36. It will be observed that rotor teeth 20e and 20h are urged in opposite axial direction by the magnetic pull so that axial thrust on shaft 1 is largely neutralized. If one of the contacts or bars 41 distributes current to brush 37, then field windings 22d and connected coils will be energized and rotor teeth 20e—20f, 20d, and 20g will be magnetically snapped into alignment with their associated stator teeth or poles, the phasing being such that this alignment occurs simultaneously. Similarly, if current is distributed to brush 38, stator windings 22e and connected coils are simultaneously energized and rotor teeth 20g—20h, 20f, and 20c, being similarly phased, will be magnetically snapped into alignment with their associated stator teeth. In each case the axial thrust is largely cancelled by an opposing thrust.

The distribution of the magnetizing current from the brushes causes rotation of shaft 1 in one direction for a given direction of rotation of shaft 46 and opposite rotation of shaft 1 occurs when reverse rotation of shaft 46 takes place. Connected selsyn motor 81 will tend to rotate in a direction dependent upon the order of distribution of current to the brushes so that contact arm 83 is stopped by element 85 or by contact 86. The phasing is arranged so that arm 83 will close the solenoid circuit by contact with element 86 when the order of energization of the three principal phases of the step motor causes shaft 1 and disc 56 to rotate clockwise as seen from the left. Reverse rotation or backswing is prevented by the locking or braking action of roller 55. The motor 81 moves arm 83 to break the circuit of solenoid 50 when opposite order of energization of the phase windings of the step motor occurs.

Since all three general sections are always effective in providing torque, this modification of the invention is a very powerful motor as compared to one in which only motor section is energized at any one moment. There is wide latitude of choice in arranging the relative positional phasing of the rotors and stators, but the over-all desired result has been described and illustrated for one example. It is obvious that various types of current distributors, or thyratrons or other electronic tubes can be used to distribute the current.

The toroidal windings 21c, 34c, 21d, 34d, 21e, and 34e provide powerful magnetizing effects especially since the magnetic paths including the associated side or face stator teeth and rotor teeth and hubs are relatively short. The air gaps between the rotor elements and associated stator elements should be as small as will be practicable, avoiding direct metallic contact of course. Laminated or powdered iron cores can be used if desired to increase frequency response and to reduce eddy current and hysteresis losses.

Figure 7:
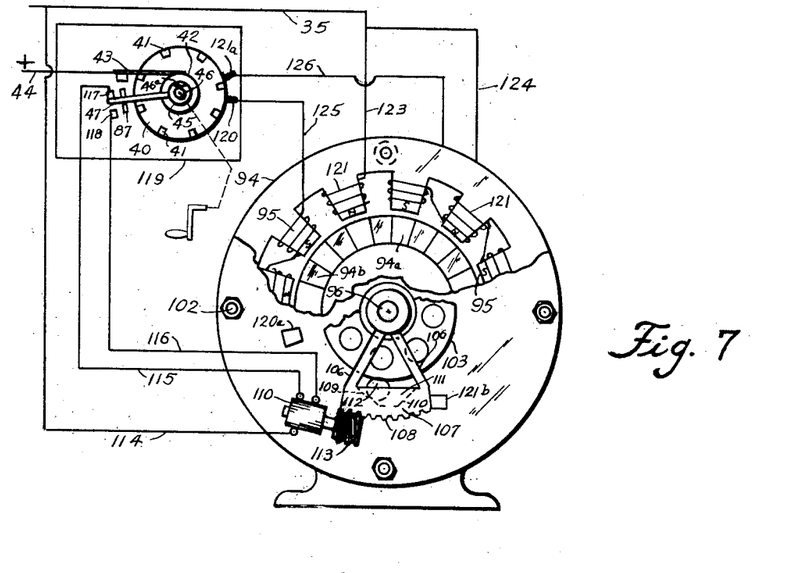
Fig. 7 is a side elevation, with cover partly broken away, showing a two phase motor.
Figure 8:
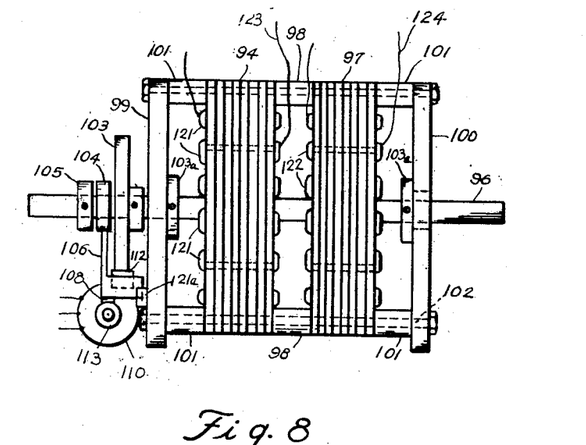
Fig. 8 is a front elevation of the motor system in Fig. 7.

Fig. 7 shows a two phase step motor. Laminated stator ring 94 of silicon steel or the like has integral poles or teeth 95 which are equally spaced around the axis of shaft 96 and the inner-circumferential width of the teeth is preferably equal to the circumferential spacing between the poles at the outside rotor diameter. As shown in Fig. 8, there are two similar stator units 94 and 97 separated by spacers 98 and separated from end plates 99 and 100 by spacers 101. The stator units, spacers, and end plates are held together as a unit by bolts 102 preferably having shoulders adjacent end plates 99 and 100. Suitable nuts fasten the bolts in place in aligned holes in the stator units, end plates, and spacers. An outside frame can be used or dowels can be employed to prevent twist of the assembly.

Shaft 96 is rotatable in bearings in the end plates and is prevented from excessive axial shift by attached collars 103a. The two rotor units are fastened to shaft 1 and have poles or teeth 94a, shown in axial alignment with stator 95, and rotor teeth 94b are in axial alignment with similar stator teeth of stator unit 97, the teeth or poles of which are preferably in circumferential register with the similar teeth of stator unit 94. These two stator units could, however, have positionally phased teeth or poles, corresponding allowance being made in the rotor teeth. The number of teeth in each rotor are equal to the number of teeth in either stator unit and are preferably equal in circumferential width to the circumferential spacing between the rotor teeth. The rotors are positionally phased so that when the teeth or poles 94a of the first rotor unit are in register or alignment with teeth or poles 95 of stator unit 94, the teeth 94b of the other rotor unit are bridging the inner circumferential space between the stator teeth of unit 97.

Disc 103, which may be made of relatively low inertia by means of holes or spokes, is fastened to shaft 96 and collar 104 floats on shaft 96 to which collar 105 is attached, preventing axial drift of collar 104. The latter collar has integral or welded arms 106 which are fastened to V cam 107 having gear teeth 108 curving about the axis of shaft 96. This cam has inclined hardened surfaces 109 and 110 oppositely sloped, and side wall 111 and a similar opposite wall cage roller 112 which is in contact with hardened disc 103. Small direct current motor 110 is fastened to end plate 99 and its shaft carries worm 113 which is meshed with gear teeth 108. Motor 110 is reversible and has conductor 114 connected with negative line 35 and forward and reverse conductors 115 and 116 connected to respective contacts 117 and 118 mounted on insulating plate 119. Contact arm 47 is fastened to collar 45 which is adapted to slip on shaft 46, friction being provided by spring 46a attached to the collar and pressing against the shaft, which is rotatable in a suitable bearing in plate 119. A handle or other drive means may be fastened to shaft 46.

Commutator bars 41 are imbedded in insulating plastic disc 40 which has concentric attached slip ring 42 which is electrically connected with contact bars 41. Brush 43 is in contact with slip ring 42 and is connected to positive line 44. Peaked cam 87 is attached to plate 119 and engages flexible arm 47 to cause it to snap against either contact 117 or 118. Stop 120a on plate 99 limits circular movement of cam 107 in clockwise direction around shaft 96 and stop 121b attached to plate 99 limits movement of the cam in counter-clockwise direction around shaft 96 (Fig. 7). Motor 110 is wound so that it can pass full current while stalled, without burning out the windings.

Brushes 120 and 121a are in contact with the rim of disc 40 and may be spaced so that the windings of one stator unit are energized before or after the windings of the other stator unit are de-energized. Magnetizing coils 121 are wound around each pole or tooth 95 of stator unit 94 and may be connected in series, making the polarity of every alternate tooth the same. There are preferably an even number of poles. Every other tooth can be fully wound, if desired. Similar windings or coils 122 are connected together, preferably in series, and make the alternate stator teeth of unit 97 of like polarity. The stator teeth of unit 97 are equal in number and spacing to the teeth of unit 94. A terminal of windings 121 is connected to negative line 35 by conductor 123 and a terminal of windings 122 is connected to negative line 35 by conductor 124. The other terminal of windings 121 is connected to brush 120 by conductor 125 and the other terminal of windings 122 is connected to brush 121a by conductor 126.

In operation, if shaft 46 is turned in clockwise direction, current from brush 43 will, through contacts 41, be distributed first to brush 121a and windings 122 and then to windings 121 through brush 120. The friction between ring or collar 45 and shaft 46 then causes contact arm 47 to strike contact 117 thereby closing the circuit to motor 110 which causes it to rotate worm 113 in a direction to move cam 107 over against stop 120a where it is held. In doing so, cam surface 110 strikes roller 112 and forces it against disc 103 so that the disc is rotated through a small angle before stop 120a is engaged. Therefore, even if the rotor teeth 94a and 94b were in the aligned or neutral position shown, these teeth will be moved to overlap the stator teeth, upon reversal, so that the motor will start rotating when the commutator or distributor is rotated. In the position described, roller 112 and associated parts allow clockwise rotation of disc 103 and rotor teeth 94a—94b but do not allow rotation in opposite direction.

Clockwise rotation of the commutator can be made to cause clockwise rotation of the rotor assembly and shaft 96. When one group of stator poles is energized or magnetized, the associated rotor induced poles are magnetically snapped into alignment but, due to momentum of the rotor system, the rotor poles swing past the aligned position so that the other rotor teeth overlap their associated stator teeth and reverse rotation of the rotor is prevented by the brake or lock. Therefore, when the other stator poles are energized, the overlapped associated rotor poles are snapped into alignment and beyond so that the first named rotor poles will again overlap their associated stator poles and step rotation of the motor is therefore possible even with two phases.

Now if it is desired to reverse the motor, commutator 40 is rotated in counter clockwise direction and arm 47 is swung against contact 118, energizing motor 119 to reverse and rotate worm 113 in a direction to move cam 107 over against stop 121b. This causes cam surface 109 to pinch roller 112 against disc 103 and so to rotate the disc sufficiently to cause one group of rotor teeth to overlap the associated stator teeth so that energization of these stator teeth will cause counter clockwise rotation of the rotor and shaft 96, clockwise rotation being prevented by disc 103, roller 112 and cam surface 109. Since the momentum of the rotor will cause the rotor teeth to stop beyond the aligned positions, with respect to the stator teeth, the rotor will rotate in steps in counter-clockwise direction as long as the commutator or distributor is rotated in that direction. The spacing and relative positioning of the contacts and other components can be so that motor 110 moves cam 107 and disc 103 while the stator fields are de-energized. In fact it is not always necessary to move disc 103 upon reversal, since if the effective direction of the brake is quickly reversed, before backswing of the rotor occurs when released, the rotor will swing past the aligned position in the direction desired. In this case cam 107 can be fastened to plate 99 by means of screws and a double roller brake as shown in Fig. 2 can be quickly reversed in effective position by means of the solenoid and spring shown. Fortunately, the torque tending to turn the rotor is maximum with a small rotor overlap, with respect to the associated stator teeth. I have found that a 10% rotor overlap will provide considerably more torque than, for instance, a 30% or 50% overlap. The actual circular width of the stator and rotor poles can be designed to meet varying conditions of load and other factors.

This two phase motor has advantages of less rotor inertia, greater starting torque, and simpler construction, as compared with a three phase motor. The rotors may be cast out of steel or laminated, as desired. The motor and worm may be replaced by a solenoid and latches.

It is obvious that numerous other modifications of the broad principles which I have disclosed can be easily made. For example, the rotors may be wound instead of the stators and the stator poles may be phased, or the rotor poles may be phased. If the rotor or rotors are wound, the iron can be reduced or removed from the rotor poles entirely if desired, since the reaction of the current-carrying conductors in the rotor with stator fields can be employed to provide torque. On the other hand, the rotor poles can be wound and both the magnetic pull and the reaction of the current-carrying rotor conductors with the stator fields can be employed. The rotor poles can have individual surrounding windings or group windings, according to design.

The motors described can be controlled by punched, magnetized, conductive, capacitive, light-modulating or other radiation-modulating tapes, belts, cards, discs or other records of various kinds. The tapes may be prepared by magnetizing, printing, punching, or other method including exposure of light-sensitive or other radiation-sensitive film to flashes of light or other energy, each spot developed on the tape corresponding to one step movement of the associated motor.

The step motors described above provide good torque, especially at relatively low speeds, do not hunt, are under precise control, can be magnetically locked when stopped especially when used with thyratrons, and do not overtravel at moderate speeds. They may be used in conjunction with tapes or other records, or with manually operated commutators, for applications in two and three dimensional machine tool controls such as with lathes, milling machines, grinders, indexing devices, synchronized drives as in gun pointing, paper and textile machinery, in control of valves at a distance, in telemetering, in control of guided missiles, in computing machines, handling devices, in control of aircraft members from the pilot's seat, and in various other applications.

More than three channels can be placed on a tape, for instance, to control any desired member of motors for shaping material or for feeding or transferring workpieces from one machine to another or from one location to another location on the same machine. The controls of a machine tool can be operated by these step motors by manually moving small commutators mounted on a small panel or box in front of the operator who may be seated. This method provides better and faster speed of manipulation of the machine parts, if manual control is desired. If desired, a ring circuit can be used in conjunction with thyratrons so that only one line of marks on a tape or other record is needed in order to fire the thyratrons in sequence. Reversal is accomplished by using relays in the grid circuits to shift the connections from one thyratron to another. A reversing relay would not be needed, however, for a two phase motor, having two control thyratrons connected in a ring circuit.

Figure 12:
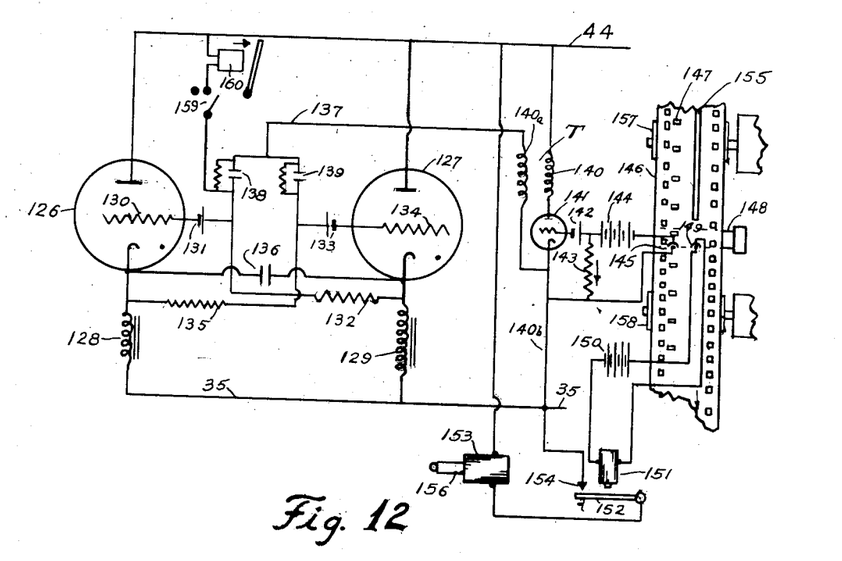
Fig. 12 is a circuit diagram showing electrical connections for controlling the motor of Figures 7 and 8.

In Fig. 12, thyratrons 126 and 127 are in series with respective two phase motor windings 128 and 129, positive line 44 being connected to the anodes of the thyratrons and negative line 35 being connected to each of the motor windings 128 and 129. Grid 130 of thyratron 126 is connected to the negative terminal of battery or other bias source 131, the positive terminal of which is connected to the cathode of thyratron 127 through resistor 132. Similarly, bias source 133 is connected between the grid 134 of thyratron 127 and the cathode of thyratron 126, in series with resistor 135. Condenser 136 is connected between the cathodes of the two thyratrons to cause the extinction of one when the other is fired.

Conductor 137 is electrically connected to the positive terminal of bias source 131 through condenser 138 and to the positive terminal of bias source 133 through condenser 139. The other end of conductor 137 is connected to secondary winding 140a of transformer T, the other end of the secondary winding being connected to conductor 140b and negative line 35. Primary 140 of transformer T is connected in series with triode 141, the cathode of which is connected to negative line 35. Bias source 142 is connected to the cathode of tube 141 through resistor 143 and normally biases tube 141 negatively virtually to cut-off. The positive terminal of battery or other current source 144 is connected to the positive terminal of source 142 and to resistor 143, the other end of which is connected to the anode of photocell or other radiation-sensitive device 145, the cathode of which is connected to the negative terminal of source 144. Photocell 145 may be of any suitable type such as the multiplier 931–A type. This photocell is placed beneath tape, belt, or film 146 which may be 35 mm. perforated motion picture film and which may be driven by suitable sprockets as indicated. The words "tape," "belt" or "film" are used to denote generally any suitable type of record.

Film 146 may be opaque with transparent or translucent windows 147 in one line or it may be clear with opaque dots or narrow lines 147. These windows or spots are in alignment with the cathode of photocell 145 beneath the film. A showcase type lamp 148, shown dotted, may be placed above the film to provide illumination for the photocells.

Photocell 149 is also placed beneath film 146 and lamp 148 and its anode is connected to the positive terminal of battery or other current source 150, the negative terminal of which is connected to the cathode of photocell 149 through the coil of sensitive relay 151. The armature of this relay is connected to positive line 44 through the winding of solenoid 153 which may also be a motor like motor 110 of Fig. 7, if desired. Contact 154 of relay 151 is connected to negative line 35. Assuming that the tape or film is opaque, strip or window 155 is clear and is aligned with the cathode of photocell 149. This window is for the purpose of admitting light to photocell 149 when it is desired to energize relay 151 to cause solenoid 153 to pull in its plunger 156 which is connected to any suitable brake reversing mechanism as previously described.

Switch 159 is between resistor 132 and positive line 44, in series with relay coil 160 so that when the switch is temporarily closed, a pulse of current is passed through the relay coil and resistor 132. The positive potential developed across resistor 132 over-rides the normal negative bias of source 131 and causes thyratron 126 to fire when switch 159 is momentarily closed. A push button, micro-switch or the like can be used for switch 159 and relay 160 may be a latching relay, if desired, to energize any part of the circuit. The relay is not essential though.

In operation, the cathodes of thyratrons 126 and 127 are heated by a source of current, as well as the cathode of triode 141. Film 146 is moved lengthwise by suitable motor-driven sprockets 158 and is guided by idler sprockets 157. Additional idlers, guides or the like can be used. Push button or switch 159 is temporarily closed to fire thyratron 126, thyratron 127 being held in nonconductive state by means of its negative bias. When a window 147 of the film passes over a suitable aperture in a light guard above photocell 145, light from lamp 148 strikes the cathode of photocell 145 and causes battery 144 to pass current through resistor 143 in the direction of the arrow, thereby suddenly making the grid of tube 141 positive and thereby producing a sudden rush of current through primary winding 140 and tube 141. The potential induced in secondary winding 140a produces a positive pulse in condensers 138 and 139. This pulse passes through these condensers and through resistors 135 and 132 and through motor windings 128 and 129 to negative line 35. The resistors are so chosen that the positive potential developed across a resistor and motor winding in series normally is not quite sufficient to over-ride the negative bias of a thyratron to fire it.

It will be observed that when thyratron 126 is fired by closing switch 159, the positive potential difference developed across winding 128 is applied to grid 134 to reduce the normal negative bias of this grid, but the reduction is not enough to cause thyratron 127 to fire. When, however, a pulse of sufficient potential is passed through condenser 139, the added positive potential applied to grid 134 causes the thyratron 127 to fire and condenser 136, in conjunction with impedances 128 and 129, quickly extinguishes thyratron 126, especially since grid 130 has its full negative bias until thyratron 127 passes current.

Now, when the next window 147 passes over photocell 145, another pulse is sent into condensers 138 and 139 and thyratron 126 is fired, since its grid is at a lower negative bias than normal, due to the positive potential difference developed across impedance 129 due to current flow therethrough. Therefore that pulse will fire thyratron 126, condenser 136 causing thyratron 127 to be extinguished. The thyratrons therefore fire alternately when positive pulses are passed through condensers 138 and 139. When it is desired to reverse the motor, elongated window 155 passes over photocell 149 thereby energizing relay 151 which in turn causes solenoid 153 to be energized and plunger 156 is pulled in to move the roller 112 of Fig. 7 or the cam 107 and roller. Reversal then occurs as explained previously.

It is obvious that triode 141 could be a thyratron or a pair of thyratrons and solenoid 153 can be replaced by motor 110 and associated mechanism. A similar ring circuit can be used for controlling three or more thyratrons in sequence. It has advantages of simplicity in that only one row of windows or spots is required on the tape or film and reversal can be accomplished by a selsyn motor or the like as in Fig. 4. The film 146 can be made by passing the sensitive film beneath an aperture under an argon lamp, flashed periodically when a model tracer or drawing tracer is moved through a predetermined distance. The film is then developed and either positive or negative prints can be employed. Any desired number of rows of spots or windows can be used to control various two phase or three phase step motors of the type I have described.

Figure 13:
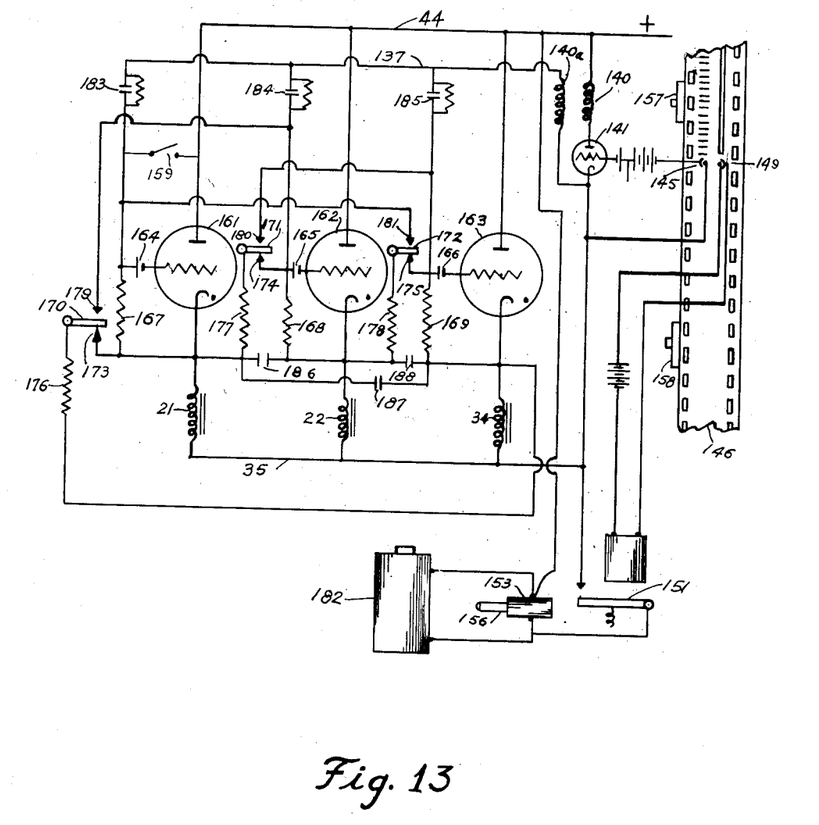
Fig. 13 is a circuit diagram showing electrical connections for a three phase step motor as shown in Fig. 1 or Fig. 4.

The circuit diagram shown in Fig. 13 illustrates a ring circuit for a three phase motor similar to that shown in Fig. 1 or in Fig. 4. Motor windings 21, 22, and 34 are connected in series with thyratrons 161, 162, and 163, between positive line 44 and negative line 35. Bias batteries or other potential sources 164, 165, and 166 normally bias the grids of respective tubes 161, 162, and 163 negatively through resistors 167, 168, and 169 connected to the cathodes as shown. These resistances preferably have rather high values, say one or more megohms. A three pole double throw relay has armatures or contact arms 170, 171, and 172 normally touching contacts 173, 174, and 175, respectively. These contacts are connected with the positive poles of respective bias units 164, 165, and 166. The relay arms 170, 171, and 172 are connected to resistors 176, 177, and 178, the other ends of which are connected, respectively, to the cathodes of thyratrons 163, 161, and 162. The other relay contacts 179, 180, and 181 are connected, respectively, to the positive terminals of bias sources 165, 166, and 164.

The pulsing circuit is substantially the same as that described in connection with Fig. 12, and the sensitive relay 151 and brake-operating solenoid 153 are similarly connected. Relay coil 182, which pulls arms 170, 171, and 172 into contact with relay contacts 179, 180, and 181, when energized, is connected in circuit with solenoid 153. Conductor 137 from transformer secondary 140a is connected with one terminal of small pulsing condensers 183, 184, and 185, the other terminals of which are connected to the positive terminals of respective bias sources 164, 165, and 166. Leakage resistors of a megohm or more are connected across these condensers. Quenching condensers 186, 187, and 188 are connected between the cathodes of tubes 161—162, 161—163, and 162—163 and serve to cause extinction of one tube when any other is fired.

In operation, switch 159 is briefly closed to fire thyratron 161 and sprocket 158 is rotated by a motor or other device so that the tape or record 146 is moved, carrying windows 147 over photocell 145 and producing a succession of positive pulses in line 137, as previously described. Since the thyratrons are connected in a counting or ring circuit and the potential drops across the windings 21, 22, and 34 are applied to reduce the negative bias of the grid just ahead, the pulses passed through condensers 183, 184, and 185 and resistors 176—167, 177—168, and 178—169 will cause only the pre-conditioned tube to fire, resulting in the thyratrons being fired in definite sequence. When it is desired to reverse the motor, window 155 causes photocell 149 to be energized, thereby actuating relay 151 and energizing solenoid 153 and relay coil 182. This causes relay arms 170, 171, and 172 to be brought into contact with respective elements 179, 180, and 181. This causes the positive potential drop across any winding 21, 22, or 34 to be applied to the grid of a thyratron one tube ahead of the tube to which it is normally applied, resulting in reverse rotation of the motor, as the succession of pulses are fed to the system through conductor 137. Since relay coil 182 is connected with brake reversing solenoid 153, the components act in unison. The resistors 167, 168, and 169 are included to maintain the negative bias on the thyratron grids while relay arms 170, 171, and 172 are swinging over from one set of contacts to the other. These could be wiping contacts, however, so that contacts 179, 180, 181 are touched by arms 170, 171, 172 before the arms are separated from contacts 173, 174, 175. In this case resistors 167, 168, and 169 will not be necessary. These resistors, if used, should be of such value that the negative bias is maintained in the absence of positive pulses, but they should be so chosen that they do not bias the grids enough positively due to the pulses to cause firing of the thyratrons.

What I claim is:

1. In an electromagnetic device, a rotor having a plurality of magnetizable poles, a first stator having a plurality of poles surrounding said rotor poles and associated therewith to produce generally radially directed magnetic flux in the air gap separating said rotor poles and stator poles, a second stator having a plurality of poles associated with said rotor to produce other flux in the air gap separating poles of said rotor and poles of said second stator, said other flux being directed at an angle to said radial flux, a third stator having a plurality of poles associated with said rotor to produce still other flux in the air gap separating poles of said rotor and poles of said third stator, said still other flux being directed at an angle to said radial flux, a plurality of winding means for causing magnetization of the poles of said first, second, and third stators, and means for energizing said winding means in predetermined order, the rotor poles and the poles of said first, second, and third stators being relatively positionally phased and means for limiting the extent of rotation of said rotor to less than one step in a direction opposite to the direction of rotation determined by the order of energization of said winding means.

2. In an electromagnetic device, a rotor having a plurality of magnetizable poles with working surfaces on the rotor periphery and on opposite faces of said rotor, a first stator having a plurality of poles surrounding said rotor poles, a second stator having a plurality of poles associated with the working surfaces of rotor poles of one face of said rotor, a third stator having a plurality of poles associated with the working surfaces of rotor poles of the opposite face of said rotor, a plurality of winding means for causing magnetization of said first, second, and third stator poles, and means for energizing said winding means in predetermined order, the poles of said rotor and stators being relatively positionally phased to cause rotation of said rotor when said winding means are energized in predetermined order and means for limiting the extent of rotation of said rotor to less than one step in a direction opposite to the direction of rotation determined by the order of energization of said winding means.

3. The device as set forth in claim 2, the axial length of said rotor poles being greater than the axial length of the poles of said first stator.

4. In an electromagnetic device, a rotor having a plurality of magnetizable poles with working surfaces on the periphery of said rotor, a plurality of generally radial magnetizable poles around one face of said rotor, a plurality of generally radial magnetizable poles around the other face of said rotor, shielding means for magnetically isolating said one face poles and other face poles from one another and from said peripheral poles, a first stator having a plurality of poles surrounding said peripheral rotor poles, a second stator having a plurality of poles associated with said one face rotor poles, a third stator having a plurality of poles associated with said other face rotor poles, said first, second, and third stator poles and said rotor poles being relatively positively phased, a plurality of winding means for causing magnetization of said first, second, and third stator poles, and means for energizing said winding means in predetermined order.

5. The device as set forth in claim 4, and including means for limiting the extent of rotation of said rotor to less than one step in direction opposite to that as determined by the order of energization of said winding means.

6. In an electromagnetic device, a plurality of stators having a plurality of groups of magnetizable poles, a plurality of rotors having magnetizable poles associated with said stator poles, a plurality of winding means for causing magnetization of said stator and rotor poles, said winding means being connected so that poles of each rotor are magnetized simultaneously, and means for energizing said winding means in predetermined order said winding means associated with said stator poles being arranged in groups disposed on opposite sides axially of said rotors, said means for energizing effecting energization simultaneously of said stator winding means disposed on opposite sides of distinct rotors to thereby limit end thrust of said rotors.

7. The device as set forth in claim 6, and including means for limiting the extent of rotation of said rotors in direction opposite to the direction as determined by the order of energization of said winding means, said limiting means being continuously effective while said rotors are rotating in any one direction.

8. In an electromagnetic system, a reversible step motor having a plurality of phases, a plurality of windings for energizing said phases, means including counting circuit means for energizing said windings in sequence, means for pulsing said counting circuit means to cause sequential energization of said phase windings, means for limiting rotation of the rotor of said motor to one direction, means for reversing the effective direction of said rotor limiting means, and record means for timing said pulsing means and for controlling said rotor limiting means to change the effective direction thereof.

9. The device as set forth in claim 8, and including means for changing connections of said counting circuit means to cause change of the sequence of energizing said windings to produce change of direction of rotation of the rotor of said step motor.

10. In an electromagnetic system, a step motor having a plurality of phases, a plurality of windings for energizing said phases, means including counting circuit means for energizing said windings in sequence, means for pulsing said counting circuit to cause sequential energization of said phase windings, a tape having a single line of spaced characteristics for controlling the speed of said motor, means for sensing said line of characteristics, electrical means connecting said sensing means and said pulsing means, relay means connected with said counting circuit for reversing the sequence of energization of said windings, said sensing means including means for causing operation of said relay means and said tape having an elongated characteristic for controlling said relay means.

11. In an electromagnetic device, a rotor having a plurality of magnetizable poles, a first stator having a plurality of poles surrounding said rotor poles and associated therewith to produce generally radially directed magnetic flux in the air gap separating said rotor poles and stator poles, the flux between the face of each stator pole and its associated rotor pole being all directed in one direction, a second stator having a plurality of poles associated with said rotor to produce another flux in the air gap separating poles of said rotor and poles of said second stator, the flux between the face of each of said poles of said second stator and its associated rotor pole being all directed in one direction at an angle to said radial flux, a third stator having a plurality of poles associated with said rotor to produce still another flux in the air gap separating poles of said rotor and poles of said third stator, the flux between the face of each of said poles of said third stator and its associated rotor pole being all directed in one direction at an angle to said radial flux, a plurality of winding means for causing magnetization of the poles of said first, second and third stators, and means for energizing said winding means in predetermined order, the rotor poles and the poles of said first, second, and third stators being relatively positionally phased.

12. An electromagnetic device as set out in claim 11 whereing the magnetization of the poles of said rotors and stators is proportioned so that the energization of any of said winding means produces substantially the same average rotor torque for successive step movements thereof.

13. In an electromagnetic device, a rotor having a plurality of magnetizable poles, each of said poles having a first peripheral face and having a pair of oppositely disposed faces, a first stator having a plurality of poles surrounding said rotor poles and associated therewith to produce generally radially directed magnetic flux in the air gap separating said peripheral face and stator poles, the width of said stator poles being substantially equal to the width of said rotor poles along their axis of rotation, a second stator having a plurality of poles associated with said rotor to produce a second flux in the air gap separating one of said sets of oppositely disposed faces and the poles of said second stator, said second flux being at an angle to said radial flux, a third stator having a plurality of poles associated with said rotor to produce a third flux in the air gap separating the other of said sets of oppositely disposed faces and the poles of said third stator, said third flux being at an angle to said radial stator, the radial length of the poles of said second and third stators being substantially equal to the radial length of the oppositely disposed faces of the rotor poles with which they are associated, a plurality of winding means for causing magnetization of the poles of said first, second and third stators, and means for energizing said winding means in predetermined order, the rotor poles and the poles of said first, second, and third stators being relatively positionally phased.

14. An electromagnetic device as defined in claim 11 including means for limiting the extent of rotation of said rotor to an angle less than the angle subtended by one rotor pole in a direction opposite to the direction of rotation determined by the order of energization of said winding means associated with said stators.

15. An electromagnetic device as defined in claim 14 wherein said last named means comprises a disc mounted for rotation with said rotor, a pair of oppositely disposed cam surfaces, rolling cam means mounted between said cam surfaces and said disc for engagement with said disc and for selective engagement with said cam surfaces, and means for moving said rolling cam means angularly about the axis of rotation of said rotor for operative engagement with one of said cam surfaces.

16. An electromagnetic device as defined in claim 14 wherein said means for energizing said winding means in predetermined order comprises counting circuit means, means for pulsing said counting circuit means to cause sequential energization of the winding means associated with said stators, means for reversing the effective direction of said rotor limiting means, and record means for timing said pulsing means and for controlling said rotor limiting means to change the effective direction thereof.

17. An electromagnetic device as defined in claim 11 wherein said means for energizing said winding means in predetermined order comprises counting means, and means for pulsing said counting means to cause sequential energization of the winding means associated with said stators.

References Cited in the file of this patent

UNITED STATES PATENTS

| | | |
|---|---|---|
| 1,301,050 | Hagman | Apr. 15, 1919 |
| 1,367,486 | Le Baron et al. | Feb. 1, 1921 |
| 1,440,729 | French | Jan. 2, 1923 |
| 1,977,745 | Thompson | Oct. 22, 1934 |
| 2,124,672 | Pershing | July 26, 1938 |
| 2,213,108 | Pollard | Aug. 27, 1940 |
| 2,449,020 | Spraragen | Sept. 7, 1948 |
| 2,507,798 | Maxwell | May 16, 1950 |
| 2,515,944 | Bennett | July 18, 1950 |
| 2,528,181 | Sacchini | Oct. 31, 1950 |
| 2,567,422 | Camp | Sept. 11, 1951 |
| 2,578,648 | Thomas | Dec. 11, 1951 |